Patented Dec. 19, 1939

2,184,168

UNITED STATES PATENT OFFICE 2,184,168

AGE RESISTOR

Winfield Scott, Akron, Ohio, assignor to Wingfoot Corporation, Wilmington, Del., a corporation of Delaware No Drawing. Application September 15, 1936,
Serial No. 100,875

11 Claims. (Cl. 260—809)

This invention relates to methods for improving the age-resisting characteristics of organic materials which are normally subject to deterioration with the passing of time or under conditions of use and to deteriorable organic materials so preserved. More particularly, the invention relates to a method of preserving rubber and to rubber so treated.

Numerous chemical compounds have been proposed for inclusion in or application to rubber to retard ageing of the same and one of the objects of this invention is to provide, for this purpose, chemical mixtures in the form of reaction products of certain substances characterized as anhydro amino benzyl alcohols and secondary aryl amines. It is found that reaction products of substances of these types exert an effective protective action on rubber and other deteriorable organic compositions or materials, such as gasoline, transformer oils, vegetable oils and the like.

Thus, anhydro para amino benzyl alcohol

may be reacted with phenyl beta naphthylamine at moderate temperatures, such as that of the steam bath, to yield, in the course of several hours, a soft resinous product. Other anhydro amino benzyl alcohols and other secondary aryl amines may likewise be reacted to give useful age-resistors, the secondary diaryl amines being preferred for the purpose.

Among the anhydro amino benzyl alcohols which may be used are anhydro para amino benzyl alcohol, 2-methyl anhydro para amino benzyl alcohol, 3-methyl anhydro para amino benzyl alcohol, 2-ethyl anhydro para amino benzyl alcohol, 3-ethyl anhydro para amino benzyl alcohol, 2-isopropyl anhydro para amino benzyl alcohol, 3-isopropyl anhydro para amino benzyl alcohol, 2-methoxy anhydro para amino benzyl alcohol, 3-methoxy anhydro para amino benzyl alcohol, 2-ethoxy anhydro para amino benzyl alcohol, and 3-ethoxy anhydro para amino benzyl alcohol. These anhydro compounds are generally prepared by reacting formaldehyde with the appropriate aromatic amine hydrochloride in hydrochloric acid solution, e. g., anhydro para amino benzyl alcohol may be prepared by reacting formaldehyde with aniline hydrochloride in hydrochloric acid solution. It is generally understood that the formula given above correctly represents the linkage in these anhydro amino benzyl alcohols, the structure given being substantiated by the fact that anhydro para amino benzyl alcohol yields para toluidine upon reduction. Accordingly, by such formula it is intended to indicate the product secured by reacting formaldehyde with an aromatic amine hydrochloride in acid solution.

The secondary aryl amine which is reacted with the anhydro amino benzyl alcohol may be diphenylamine, phenyl tolyl amine, ditolyl amine, 4-methoxy diphenylamine, 4-ethoxy diphenylamine, phenyl alpha naphthylamine, phenyl beta naphthylamine, diphenyl para phenylene diamine, or other compounds of similar nature in which, preferably, at least one of the para positions to the secondary amino group is unsubstituted.

The course followed by the reaction between the anhydro body and the secondary aromatic amine is not definitely established but, since the reaction product, as a whole, is an effective age-resistor or antioxidant in deteriorable organic materials, such as rubber, it has not been deemed necessary to isolate the constituents of the mass. The manner of preparation of the age-resistors is illustrated by the following examples.

Example 1

The reaction between phenyl beta naphthylamine and anhydro para amino benzyl alcohol is carried out as follows: To 65.7 grams of phenyl beta naphthylamine is added 100 cc. of alcohol and 30 cc. of concentrated hydrochloric acid is then stirred into the mixture. To this is added 32.5 grams of anyhdro para amino benzyl alcohol, whereupon the reaction mixture at once assumes a yellowish color accompanied by a rise in temperature. The mixture is next digested on a steam bath for 8 hours and then poured into one liter of water with stirring. Strong sodium carbonate solution is added until the liquid shows a permanent alkaline reaction. After removing the water, washing and drying, a soft resin, which can be softened in the hands, is obtained and used as an age-resistor.

Example 2

The reaction between diphenyl para phenylene diamine and anhydro para amino benzyl alcohol is carried out in a similar manner. To 52 grams of diphenyl para phenylene diamine is added 150 cc. of alcohol and then 20 cc. of concentrated hydrochloric acid. To the slurry so formed is then added 23 grams of anhydro para amino benzyl alcohol, whereupon the reaction mixture assumes a bluish color after a few minutes digestion on the steam bath. Heating is continued for a total time of seven hours and the reaction mass then poured into water and neutralized with sodium carbonate solution. Upon drying, a yield of 98% of the theoretical was obtained, the product being a greenish-gray powder. With concentrated sulphuric acid containing a small amount of nitric acid, a purple color is obtained, whereas diphenyl para phenylene diamine gives a carmine red.

In general, the conditions of reaction for the preparation of the age-resistor are mild and not critical, a temperature in the neighborhood of the boiling point of water being practical, but this may be either higher or lower with a corresponding change in the time of reaction. Ordinarily, at the temperature of the steam bath, a period of reaction of 6 to 10 hours suffices to bring the reaction to substantial completion. The secondary aryl amine and the anhydro amino benzyl alcohol are present in approximately equimolecular proportions, although this ratio may be departed from to some extent.

The age resistors prepared in the preceding examples were tested in rubber stocks to indicate their probable value as compared with phenyl beta naphthylamine (PBN) taken as a standard, phenyl beta naphthylamine being a widely used age-resistor for rubber. Low temperature ageing tests were carried out by incorporating the age-resistor in a stock of the following composition:

| | Parts by weight |
|---|---|
| Extracted pale crepe | 100 |
| Zinc oxide | 5 |
| Sulfur | 3 |
| Hexamethylene tetramine | 1 |
| Stearic acid | 1.5 |
| Antioxidant | 1 |

The stock containing the age-resistor was cured for 50 minutes at 285° F. and the cured samples were then placed in an oxygen bomb at a temperature of 50° C. and under a pressure of 150 pounds per square inch for a period of six days.

A high temperature ageing test was conducted by placing the age-resistors in a stock of the following composition:

| | Parts by weight |
|---|---|
| Smoked sheet | 100.00 |
| Zinc oxide | 5.5 |
| Carbon black | 50.75 |
| Sulfur | 2.75 |
| Stearic acid | 3.50 |
| Pine tar | 3.00 |
| Mercaptobenzothiazole | 1.00 to 1.10 |
| Antioxidant | 1.00 |

The test pieces were cured for 70 minutes at 260° F. and were then placed in an air bomb at 114° C. under a pressure of 80 pounds per square inch for a period of 7 hours.

Flex tests were also conducted on the stock just mentioned by flexing the pieces in a machine at a constant rate until failure occurred and then comparing the time elapsed to failure with the time elapsed when phenyl beta naphthylamine was used.

The results obtained in all three of these tests are summarized as follows, the figures for both ageing tests referring to the percentage of the original tensile strength remaining after the test and the figures in the flexing test referring to the length of time elapsing to failure as compared with the same figure for phenyl beta naphthylamine.

| Compound | Low temperature ageing, % orig. tens. | High temperature ageing, % orig. tens. | Flex life percent PBN | |
|---|---|---|---|---|
| | | | 70' | 140' |
| Phenyl beta naphthylamine + anhydro p-amino benzyl alcohol | 95 | 57 | 90 | 77 |
| Diphenyl p-phenylene diamine + anydro p-amino benzyl alcohol | 109 | 61 | 100 | 94 |
| Phenyl beta naphthylamine | 103 | 69 | | |

It will be observed from the foregoing data that the reaction products constituting the new age-resistors gave results in all three tests comparing very favorably with those obtained when phenyl beta naphthylamine was used, the latter being a convenient standard. While the tests given were carried out on rubber, the compositions are also useful with other rubber-like materials, such as balata, gutta percha, reclaimed rubber, synthetic rubber, latex, etc., the term "rubber" as used in the appended claims being intended to include such rubber-like materials as well as rubber itself. The age-resistor may be used to treat the rubber or the other similar substances mentioned either alone or in conjunction with vulcanizing agents, accelerators, pigments, fillers and other adjuvants customarily added to rubber. Likewise, the age-resistors may be used to treat other deteriorable organic materials such as those previously mentioned.

While there have been described above certain preferred embodiments of the invention, it will be understood that the same are by way of illustration only and that the invention is not limited thereto. Accordingly, it is intended to cover in the appended claims all patentable features of the invention herein described.

What I claim is:

1. A method of preserving organic materials subject to deterioration which comprises treating the same with a preformed reaction product obtainable by heating a mixture of approximately equimolecular quantities of an anhydro amino benzyl alcohol and a secondary aryl amine until the reaction has been completed.

2. A method of improving the age resisting characteristics of organic materials subject to deterioration which comprises treating the same with a preformed reaction product obtainable by heating a mixture of approximately equimolecular quantities of an anhydro para amino benzyl alcohol and a secondary aryl amine until the reaction has been completed.

3. A method of improving the age resisting characteristics of rubber which comprises incorporating therein before vulcanization a preformed reaction product obtainable by heating a mixture of approximately equimolecular quantities of an anhydro para amino benzyl alcohol and a secondary diaryl amine until the reaction has been completed.

4. A method of preserving rubber which comprises treating the same with a preformed reaction product obtainable by heating a mixture of approximately equimolecular quantities of an anhydro para amino benzyl alcohol and phenyl beta naphthylamine until the reaction has been completed.

5. A method of preserving rubber which comprises treating the same with a preformed reaction product obtainable by heating a mixture of approximately equimolecular quantities of anhydro para amino benzyl alcohol and phenyl beta naphthylamine.

6. A method of preserving rubber which comprises treating the same with a preformed reaction product obtainable by heating a mixture of approximately equimolecular quantities of anhydro para amino benzyl alcohol and diphenyl para phenylene diamine.

7. A method of preserving organic materials subject to deterioration which comprises treating the same with the preformed product of reaction of approximately equimolecular quantities of an anhydro para amino benzyl alcohol and a secondary aryl amine reacted at about the temperature of the steam bath for a period of about 6 to 10 hours.

8. An age resisting organic material comprising such a material which is normally subject to deterioration and a preformed reaction product of approximately equimolecular quantities of an anhydro amino benzyl alcohol and a secondary aryl amine.

9. An age resisting rubber product comprising rubber and a preformed reaction product of approximately equimolecular quantities of anhydro para amino benzyl alcohol and a secondary diaryl amine.

10. An age resisting rubber product comprising rubber and a preformed reaction product of approximately equimolecular quantities of anhydro para amino benzyl alcohol and phenyl beta naphthylamine.

11. An age resisting rubber product comprising rubber and a preformed reaction product of approximately equimolecular quantities of anhydro para amino benzyl alcohol and diphenyl para phenylene diamine.

WINFIELD SCOTT.